United States Patent [19]

Heidemann

[11] Patent Number: 5,247,529
[45] Date of Patent: Sep. 21, 1993

[54] OPTICAL COMMUNICATION TRANSMISSION SYSTEM WITH OPTICAL CONTROL OF AN OPTICAL AMPLIFIER

[75] Inventor: Rolf Heidemann, Tamm, Fed. Rep. of Germany

[73] Assignee: Alcatel N.V., Amsterdam, Netherlands

[21] Appl. No.: 884,343

[22] Filed: May 18, 1992

[30] Foreign Application Priority Data

May 18, 1991 [DE] Fed. Rep. of Germany ....... 4116433

[51] Int. Cl.$^5$ ............................................. H01S 3/10
[52] U.S. Cl. ........................................ 372/23; 372/22
[58] Field of Search .................. 372/6, 22, 28, 31, 23; 359/341

[56] References Cited

U.S. PATENT DOCUMENTS

| | | | |
|---|---|---|---|
| 4,726,012 | 2/1988 | Amadieu et al. | 370/3 |
| 5,138,483 | 8/1992 | Grasso et al. | 372/6 |
| 5,140,456 | 8/1992 | Huber | 372/6 |
| 5,140,598 | 8/1992 | Tagawa et al. | 372/6 |
| 5,161,050 | 11/1992 | Grasso et al. | 372/6 |

FOREIGN PATENT DOCUMENTS 0200613 12/1986 European Pat. Off.

OTHER PUBLICATIONS

Wedding et al., "5 GBIT/S Transmission over 146 KM using Erbium-Doped Fibre Amplifier," ECOC '89, 15th European Conference on Optical Communication, Proceedings, vol. 1, 1989, Sweden, pp. 86–89.

Millar et al., "Efficient Up-Conversion Pumping at 800nm of an Erbium-Doped Fluoride Fibre Laser Operating at 850nm," *Electronics Letters*, vol. 26, No. 22, Oct. 25, 1990, pp. 1871–1873.

Miniscalco, "Erbium-Doped Glasses for Fiber Amplifiers at 1500nm," *Journal of Lightwave Technology*, vol. 9, No. 2, Feb. 1991, pp. 234–250.

*Primary Examiner*—John D. Lee
*Assistant Examiner*—Robert E. Wise
*Attorney, Agent, or Firm*—Spencer, Frank & Schneider

[57] ABSTRACT

An optical system includes an optical amplifier having a laser active substance and a first laser that generates pump light at a first wavelength for the laser active substance, a second laser which generates light a second wavelength selected so that the light of the second wavelength can be amplified in the optical amplifiers, a first coupler for coupling the light of the second wavelength into the optical amplifier, a third laser which generates light at a third wavelength, and a second coupler for coupling light of the third wavelength into the optical amplifier. The wavelength of the light generated by the third laser is selected so that amplification of the light of the second wavelength on the basis of the pump light can be controlled as a function of the intensity of the light generated by the third laser.

8 Claims, 3 Drawing Sheets

OPTICAL COMMUNICATION TRANSMISSION SYSTEM WITH OPTICAL CONTROL OF AN OPTICAL AMPLIFIER

CROSS REFERENCE TO RELATED APPLICATION

This application claims the priority of Application Ser. No. P 4,116,433.4, filed May 18, 1991, in the Federal Republic of Germany, the subject matter of which is incorporated herein by reference.

BACKGROUND OF THE INVENTION

1. Field of the Invention

The invention relates to an optical system including an optical amplifier having a laser active substance and a pump laser, and having a second laser producing light which can be amplified in the optical amplifier.

2. Background Information

The term "optical system" is hereinafter understood to mean a combination of various optical devices such as, for example, lasers, light waveguides, fiber-optic amplifiers, which coact with one another while possibly being disposed far removed from one another.

The article in "ECOC'89, Fifteenth European Conference on Optical Communication", Sep. 10-14, 1989, Gothenburg, Sweden, Proceedings, Vol. 1, Regular Papers TuA5-7, pages 86-89, discloses such an optical system. The system is an optical communication transmission system. The laser active substance employed in the fiber-optic amplifier is composed of $Er^{3+}$ ions which are included as doping agent in a section of a light waveguide. The first laser generating the pump light is a $Kr^{3+}$ gas laser and the wavelength of the pump light is 530.9 nm. The second laser is disposed far removed from the fiber-optic amplifier. The light it emits has a wavelength of 1537 nm and is amplified by the fiber-optic amplifier. A light waveguide of a length of more than 70 km serves to couple the light generated by the second laser into the fiber-optic amplifier.

The second laser generates light whose intensity is modulated with the electrical communication signal to be transmitted. The laser is therefore called the transmitting laser of the optical communication transmission system.

For the present invention, the modulation of the light generated by the second laser and several special characteristics of the prior art optical system, for example the spatial separation of its various components, are insignificant. The only important factor is that the system includes a fiber-optic amplifier equipped with a pump laser and that a second laser is provided whose output light is coupled into the fiber-optic amplifier and is amplified therein.

SUMMARY OF THE INVENTION

It is an object of the invention to reconfigure the above described system so that novel uses result which have advantages over the prior art solutions employed for the same applications.

This is accomplished according to one embodiment of the invention by providing a third laser whose light is coupled into the optical amplifier, in addition to the light coming from the second laser, so as to control the amplification of the light coming from the second laser. There is thus provided an optical control of the amplification taking place in an optical amplifier. In another embodiment of the invention, the third laser produces light of a third wavelength in such a way that absorption of light of the third wavelength permits a control of the occupation of a the metastable energy level from which induced emission of light at the second wavelength takes place.

A configuration of the system according to another embodiment of the invention makes possible an interesting use of the invention for wavelength conversion in optical communication transmission systems. The second laser generating the amplifiable light is here—in contrast to the above-mentioned prior art systems—a laser which emits unmodulated light, and the third laser is a laser which emits light modulated with communication signals. Since the third laser's modulation controls the amplification of the light emitted by the second laser, this modulation is transferred to the intensity of the light at the second wavelength appearing at the output of the optical amplifier. In other words, the optical input signal at the third wavelength is converted into an optical output signal at the second wavelength. The advantage of a thus configured system when employed for wavelength conversion is that the wavelength conversion is effected by purely optical means, instead of in the conventional way where light at the first wavelength is directed into a photodiode and initially converted into a current, this current then being employed to operate a laser which emits light at the desired wavelength.

The system according to the invention is of advantage for optical communication transmission for at least the following reasons: it permits the use of an economical transmitting laser for the optical communication transmission system, for example, a semiconductor laser emitting light signals in a wavelength range around 850 nm, in conjunction with a light waveguide that is transparent for a wavelength of 1550 nm, and exhibits only slight attenuation at this wavelength. By converting the light signals emitted by the transmitting laser into light signals having a wavelength of 1550 nm, care is taken that the optical signal to be transmitted has a wavelength suitable for transmission over long distances.

This advantage becomes even more evident in a configuration of the system according to a further embodiment of the invention. This embodiment employs a plurality of transmitting lasers which emit light at a wavelength of 850 nm that is modulated with the communication signals, and the emitted light signals are transmitted in each case over a light waveguide to an optical multiplexer that combines them into a multiplex light signal. This multiplex light signal is then used to control the amplification of unmodulated light from the second laser, thus converting its wavelength into the wavelength of 1550 nm of the second laser.

According to the embodiment of FIG. 5, the invention also includes a configuration of the optical system in which the second laser, whose output light is amplified in the optical amplifier, constitutes the signal transmitting laser of an optical communication transmission system. The amplification of the signal light can then be optically controlled with the aid of the third laser. The invention can thus be employed whenever a control or regulation of the amplification of an optical signal to be transmitted is required. If the light emitted by the third laser is modulated with an additional electrical signal, for example, a signal from a service channel, the control of the amplification of the optical signal originating from the second laser as a function thereof, results in the additional signal being modulated onto the optical signal from the second laser.

According to a further embodiment of the invention, a modulation signal or a control signal may also be formed of optical signals from a plurality of lasers having the same wavelength ($\lambda_3$) so that either the second laser is able to control the communication signal to be transmitted by means of several control signals, or the signal can be additionally modulated with several additional signals.

BRIEF DESCRIPTION OF THE DRAWINGS

The invention will now be described, in greater detail with the aid of drawings in which.

DETAILED DESCRIPTION OF THE PREFERRED EMBODIMENTS

Figure 1:
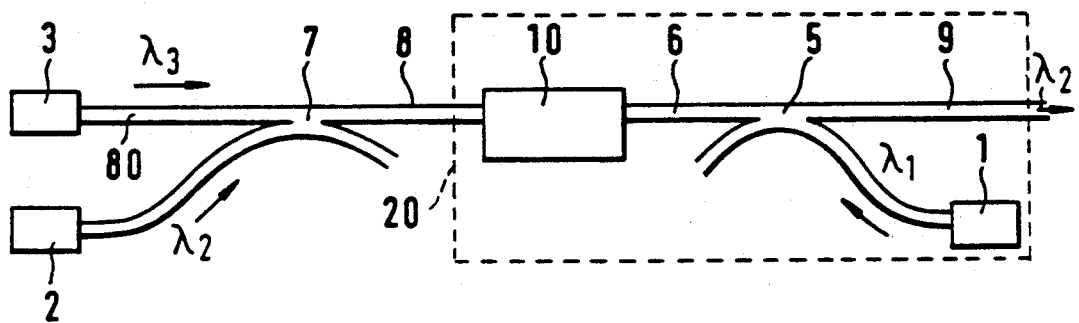
FIG. 1 shows the basic structure of the optical system according to the invention.

The optical system according to FIG. 1 includes an optical amplifier that is indicated by a dashed border and is given the reference numeral 20. The optical amplifier is inserted into a light waveguide path. It receives its optical input signal to be amplified from a light waveguide 8, and emits its optical output signal through a light waveguide 9. The output signal is then transmitted to an optical receiver (not shown). Due to the laser function of the optical amplifier 20, light that it receives at its input at a certain wavelength is put out at its output at the same wavelength, but with amplified intensity. Such a wavelength is indicated in FIG. 1 as $\lambda_2$, and a laser 2 is shown which generates light at such a wavelength.

Optical amplifier 20 includes a medium 10 which is composed of a laser active substance, for example, $Er^{3+}$ ions. Preferably, medium 10 is a light waveguide section that is doped with the laser active substance, for example $Er^{3+}$ ions. The basic material of the light waveguide section is the same as that of conventional light waveguides, namely $SiO_2$. However, the basic material of the light waveguide section may also be different, for example fluorozirconate. The laser active substance may also be an element other than erbium, particularly another rare earth element. It need not be present as doping material in the light waveguide section. In certain cases it may also be the material of medium 10 itself, so that medium 10 is composed of the pure laser active substance. Preferably, medium 10 is a light waveguide section doped with a laser active substance and in that case the optical amplifier is called a fiber-optic amplifier.

Optical amplifier 20 further includes a laser 1, usually called a pump laser, which generates pump light at a wavelength of $\lambda_1$. It is connected by way of a light waveguide coupler 5 and a light waveguide section 6, with the medium 10 including the laser active substance, for example, an $Er^{3+}$ doped light waveguide section. The wavelength $\lambda_1$ of the pump light and the wavelength $\lambda_2$ of the optical amplifier input light to be amplified correspond to the spacings of the energy levels of the laser active substance as will be described in further detail with reference to FIG. 2. If one considers laser 2 as the laser which makes available the optical signal to be transmitted in a communication transmission system, the portion of the optical system of FIG. 1 described so far corresponds to the above mentioned prior art optical communication transmission system.

However, it is of no significance for the invention whether laser 2 is the signal source of an optical transmission system. In principle, it is only important that the laser generates light that can be amplified in the optical amplifier, regardless of whether the light is unmodulated or modulated with communication signals. Hereinafter, pump laser 1 is called the "first laser" of the optical system and laser 2 which generates the amplifiable light is called the "second laser" of the optical system. For the sake of simplicity, the term "light" is employed for any optical radiation, thus also those including wavelengths outside of the visible range.

According to the invention, the optical system according to FIG. 1 includes a third laser 3 whose output light at a wavelength $\lambda_3$ is radiated into the medium 10 including the laser active substance. The means for coupling the output light of laser 3 into medium 10 is, for example, a light waveguide coupler 7 whose one output is connected with light waveguide section 8 and whose second terminal is connected with the output of laser 2 and whose third terminal is connected by way of a light waveguide section or a light waveguide path 80 with the output of the third laser 3.

The wavelength $\lambda_3$ of the light generated by the third laser 3 is selected in such a way that the amplification of the light at wavelength $\lambda_2$ from second laser 2, as it takes place in optical amplifier 20 on the basis of the pump light, is controllable as a function, of the intensity of the light from the third laser.

Figure 2:
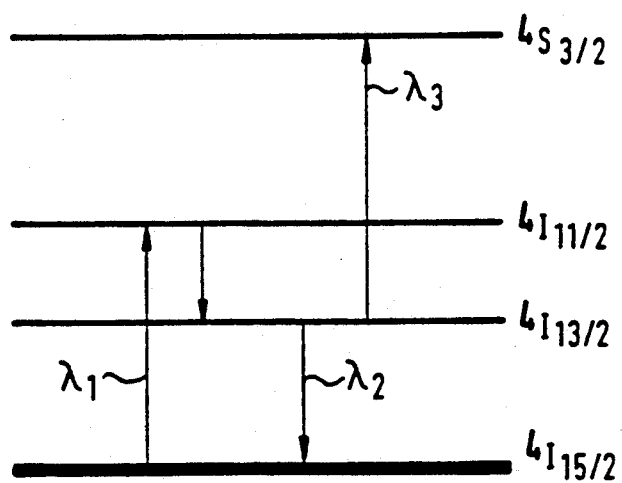
FIG. 2 shows, for the example of $Er^{3+}$ ions as the laser active substance, several energy levels and state transitions utilized by the invention.

How this operates will be described with reference to FIG. 2 for the example where the laser active substance is the doping material $Er^{3+}$ that is contained in a light waveguide section.

By continuous irradiation with light from first laser 1 at a first wavelength $\lambda_1 = 980$ nm, the electrons at the basic level $^4I_{15/2}$ are excited to a first energy level, energy level $^4I_{11/2}$ This energy level is decomposed by irradiation with light at a wavelength of 2700 nm into a second energy level, the metastable energy level $^4I_{13/2}$. The light at wavelength 2700 nm is absorbed either in light waveguide section 10 itself or in light waveguides 6 and 8 following thereafter.

If now light whose energy corresponds to the energy difference between the second energy level and a lower third energy level, in the case of $Er^{3+}$ the basic level, impinges on the laser active substance, the laser active substance will be induced to emit photons and to change to the third energy level, thus amplifying the light incident on the laser active substance. The wavelength corresponding to this energy difference is $\lambda_2 = 1550$ nm. In addition to this induced emission of light at wavelength $\lambda_2$, there is also a spontaneous emission of light at the same wavelength, thus causing the electrons to return from energy level $^4I_{13/2}$ to the basic level $^4I_{15/2}$ which forms a third energy level. However, if light at the second wavelength $\lambda_2$ from second laser 2 is radiated in, this transition occurs primarily by induced emission. Insofar as described above, this is the known amplification of light at a wavelength of 1550 nm in a fiber-optic amplifier pumped with pump light of a wavelength of 980 nm and equipped with a light waveguide section that is doped with $Er^{3+}$.

If additionally light from the third laser 3 is radiated into light waveguide section 1 at a third wavelength $\lambda_3$ which corresponds to the energy difference between the second energy level $^4I_{13/2}$ and a higher energy level, the emission of light at wavelength $\lambda_2 = 1550$ nm is influenced. The absorption of the light from the third laser 3 causes a large portion of the electrons occupying energy level $^4I_{13/2}$ to change to the higher energy level with the result of noticeably reducing the number of electrons that travel from the second energy level $^4I_{13/2}$ to the third energy level, the basic level $^4I_{15/2}$. In particular, the induced emission at a wavelength of 1550 nm is reduced. In this way, the known absorption of excited states (excited state absorption (ESA)) is utilized according to the invention to control the amplification of light at wavelength $\lambda_2$.

The absorption of the excited state $^4I_{13/2}$ is known from C. A. Millar et al, "Efficient Up-Conversion Pumping at 800 nm of an Erbium-Doped Fluoride Fibre Laser Operating at 850 nm", Electronics Letters, Oct. 25, 1990, Vol. 26, No. 22, pages 1871-1873 for a laser whose laser active substance is composed of $Er^{3+}$ ions that are included as the doping agent in a fluorozirconate light waveguide section. It is there employed to occupy an even higher energy level so as to permit spontaneous emission based on this even higher energy level. The mentioned absorption thus serves to pump to a higher energy level from an energy level occupied as a result of a first pumping.

In connection with fiber-optic amplifiers, the absorption from an excited state is known from the article by W. J. Miniscalco, entitled "Erbium-Doped Glasses For Fiber Amplifiers at 1500 nm", Journal of Lightwave Technology, Vol. 9, No. 2, February, 1991, pages 234-250. It is there not utilized at all but is considered a loss mechanism which is damaging for the efficiency of the amplification (page 235, right-hand column, second paragraph).

In order to produce transitions to a higher energy level, energy level $^4S_{3/2}$ by absorption the third laser 3 emits light at the third wavelength $\lambda_3 = 850$ nm; this wavelength corresponds to the energy difference between energy levels $^4I_{13/2}$ and $^4S_{3/2}$.

The intensity of the light radiated through light waveguide section 6 and light waveguide coupler 5 from light waveguide section 10 into light waveguide 9, due to the absorption that causes transition from energy level $^4I_{13/2}$ to energy level $^4S_{3/2}$—assuming the emission of light from first laser 1 and second laser 2 is constant—depends on whether the third laser 3 is switched on and the intensity of the light it emits. The amplification of the light transmitted by second laser 2 can thus be controlled by changing the intensity of the light radiated from third laser 3 into light waveguide section 10.

The arrangement of first laser 1 and third laser 3 relative to light waveguide section 10 can be exchanged. Moreover, the light from all three lasers 1 to 3 can be fed into light waveguide section 8 through a single light waveguide coupler. Or, the light from first laser 1 and from third laser 3 is fed together into light waveguide section 10 in a direction opposite to the direction of transmission of the light from second laser 2.

Preferably, lasers 1 to 3 are semiconductor lasers whose composition is determined according to the wavelength that they are to emit. In the embodiment selected here, first laser 1 is an InGaAs/GaAs semiconductor laser, second laser 2 is an InGaAsP/InP semiconductor laser and third laser 3 is a GaAlAs/GaAs semiconductor laser.

Figure 3:
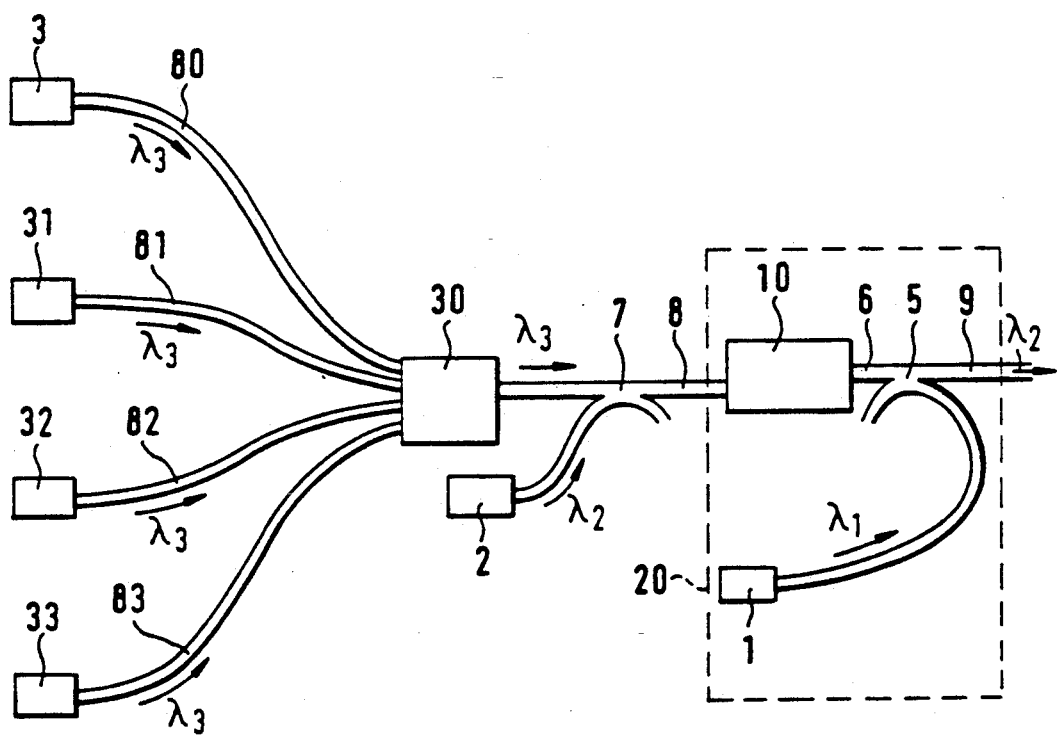
FIG. 3 shows an embodiment of the invention in which several lasers are provided in the optical amplifier to control the amplification.

A modification of the optical system of FIG. 1 is shown in FIG. 3. In addition to the system components already included in FIG. 1, this embodiment includes, in addition to third laser 3, further lasers 31, 32, and 33. By way of light waveguides 80, 81, 82 and 83, respectively, lasers 3, 31, 32 and 33 are connected with an optical multiplexer 30 into which they each radiate light signals at wavelength $\lambda_3$.

Such optical multiplexers are known per se, for example, from EP 0,200,613.B1.

From the light signals, multiplexer 30 generates a multiplex light signal which enables the amplification of light of wavelength $\lambda_2$ to be controlled, as in the first embodiment, by light from third laser 3. Thus the wavelength $\lambda_3$ of the optical multiplex signal can be converted to wavelength $\lambda_2$ in light waveguide section 10 so that it can be transmitted through light waveguide 9 over large distances with only little attenuation.

It has been explained above that the novel optical system offers an opportunity to control the amplification of light in an optical amplifier by light from a further laser, called the "third laser". The optical system need not be an optical communication transmission system but may be any desired system in which a control of the amplification of light in an optical amplifier is of use.

If the novel optical system is employed for optical communication transmissions, the following interesting possibilities result:

If third laser 3 does not emit light continuously but emits light signals, that is, modulated light, but the second laser 2 emits light continuously, that is, unmodulated light, the novel optical system can be employed as an optical communication transmission system in which the wavelength of the transmitted optical signal is converted. In this case, the third laser 3 is called the transmitting laser. If it generates, for example, a corresponding light signal at wavelength $\lambda_3 = 850$ nm from an electrical digital signal, the induced emission of light at wavelength $\lambda_2 = 1550$ nm changes correspondingly almost without delay precisely inversely to the incoming light signal from third laser 3. Thus, the modulation contained in the light transmitted by transmitting laser 3 is changed into a modulation of the light at wavelength $\lambda_2$ appearing at the output of the optical amplifier. In other words, the signal light at wavelength $\lambda_3$ is changed to signal light at wavelength $\lambda_2$.

An inherent characteristic of the novel optical system is that it acts not only as an optical wavelength converter but simultaneously as an optical inverter. A "0" or "1" value of a bit of the digital electrical modulation signal from transmitting laser 3 corresponds to a "1" or "0" value, respectively, for the corresponding bit of the digitally modulated light signal emitted from light waveguide section 10. By way of light waveguide 9, the light signal at wavelength $\lambda_2$ produced by wavelength conversion is transmitted to a receiver (not shown). The fact that it is necessary there to invert the received digital signal involves only insignificant expense.

Figure 4:
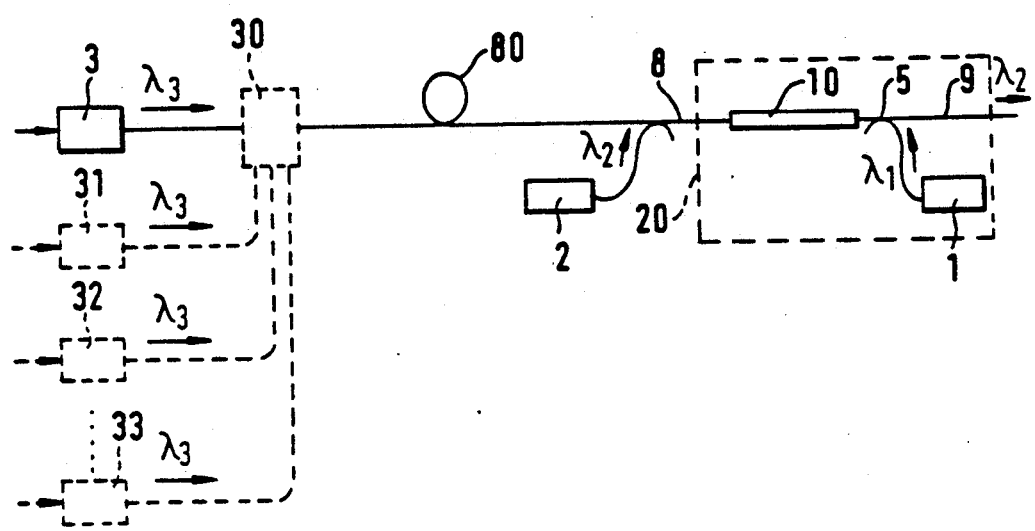
FIG. 4 shows use of the invention to convert the wavelength of the optical signal to be transmitted.

FIG. 4 shows the above-described configuration of the novel optical system used as an optical transmission system producing wavelength conversion. Transmitting laser 3 is located far removed from optical amplifier 20 as indicated by the light waveguide 80 extending therebetween. The second laser 2 producing amplifiable light at wavelength $\lambda_2$ is preferably disposed near optical amplifier 20. It generates unmodulated light.

The optical amplifier 20 is preferably a fiber-optic amplifier including a light waveguide section 10 which, for example, is an $Er^{3+}$ doped light waveguide section. Otherwise the same reference numerals are employed as in the corresponding system components of the system shown in FIG. 1 so that a detailed discussion thereof is not necessary.

It is significant that an economical 850 nm laser can be employed as transmitting laser 3 and that, according to the invention, the wavelength of the optical signal emitted by this laser is converted into a wavelength of 1550 nm which is the suitable wavelength for further transmission over a long light waveguide distance.

This advantage becomes even more distinct if, as shown in dashed lines in the left side of FIG. 4, several transmitting lasers 3, 31, 32 and 33 are provided which emit light signals at a wavelength of 850 nm. In a multiplexer 30, these light signals are then combined into a multiplex light signal and in fiber-optic amplifier 20 this wavelength is converted to the wavelength of 1550 nm. This can be utilized in an optical communication transmission system in which a plurality of closely adjacent subscribers are to send their transmit signals over a light waveguide to a central office. The invention makes it possible for the plurality of subscriber transmitting lasers to be economical lasers and only a single more expensive 1550 nm laser, laser 2 in fiber-optic amplifier 20, is required to give the transmitted multiplex signal the desired wavelength $\lambda_2$ which is suitable for further transmission over a long light waveguide distance.

Figure 5:
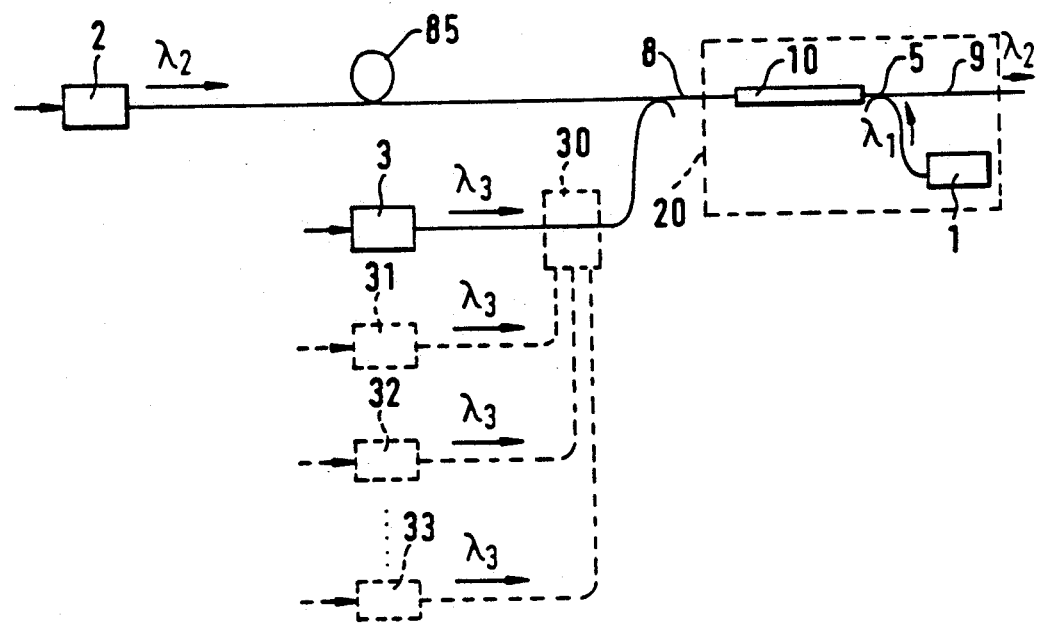
FIG. 5 shows use of the invention for controlling the amplification of an optical signal to be transmitted or to modulate the signal with an additional signal.

FIG. 5 shows a different application for the optical system according to the invention as shown in FIG. 1, or for which the system according to FIG. 3. Here the second laser 2, generates the light that can be amplified in optical amplifier 20, is the transmitting laser of an optical communication transmission system, that is, its output light is an optical signal, that is, it is light modulated with an electrical communication signal. To make this evident, it is shown as a laser 2 that is spatially far removed from the optical amplifier 20 in the system and is connected with optical amplifier 20 by way of a light waveguide 85.

The third laser 3 provided according to the invention here offers an opportunity to control the amplification of the optical signal at wavelength $\lambda_2$ to be transmitted. The invention can thus be used for any application in which it is useful to control the amplification of an optical signal in an optical amplifier.

Since it is possible to control the amplification by means of third laser 3, it is also possible to impress an additional amplitude modulation on the transmitted optical signal at wavelength $\lambda_2$ if the output light of laser 3, which controls the amplification, is modulated accordingly. One possible such application may be the transmission of an additional signal, for example, from a service channel, in addition to the primarily transmitted optical signal.

Instead of a single laser 3 which generates light at wavelength $\lambda_3$, several of such lasers may be provided as indicated in dashed lines for lasers 31, 32 and 33. Their output light signals all have the same wavelength $\lambda_3$ as indicated in FIG. 3, and are combined in a multiplexer 30 into a multiplex signal. Thus it is possible to control the amplification of the optical signal at wavelength $\lambda_2$ by means of several mutually independent signals, or to additionally modulate a multiplex signal composed of several partial signals onto the optical signal at wavelength $\lambda_2$.

It will be understood that the above description of the present invention is susceptible to various modifications, changes and adaptations, and the same are intended to be comprehended within the meaning and range of equivalents of the appended claims.

What is claimed is:

1. An optical system comprising:
   an optical amplifier having a laser active substance and a first laser that generates pump light of a first wavelength for the laser active substance;
   a second laser which generates light of a second different wavelength, the light of the second wavelength for amplification in the optical amplifier;
   first coupling means for coupling the light of the second wavelength into the optical amplifier;
   a third laser which generates light of a third wavelength different from the first and second wavelengths, for controlling amplification of the light of the second wavelength by excited state absorption of light of the third wavelength in the laser active substance; and
   second coupling means for coupling light of the third wavelength into the optical amplifier;
   wherein amplification of the light of the second wavelength is controlled as a function of the intensity of the light generated by the third laser.

2. A system according to claim 1, wherein the excited state absorption of light of the third wavelength in the laser active substance produces transitions of electrons from a metastable energy state, whose occupation is effected by absorption of pump light, to a higher energy state, whereby the occupation of the metastable state is controlled by the light of the third wavelength.

3. An optical system according to claim 2, wherein:
   the second laser emits unmodulated light of the second wavelength; and
   the third laser emits light of the third wavelength which is modulated in intensity by communication signals, whereby amplification of the light of the second wavelength, which amplification is a function of the light from the third laser, is utilized to convert the light signal emitted by the third laser into a light signal of the second wavelength, in the optical amplifier.

4. An optical system according to claim 2, wherein the second laser emits light that is modulated by communication signals, and wherein the third laser emits light at one of a controlled and a modulated intensity so that as a function thereof, the amplification of the light containing the communication signals in the optical amplifier can be one of controlled and modulated, respectively by means of the third laser.

5. An optical system according to claim 2, wherein a plurality of further lasers are provided, the light produced by the plurality of further lasers being of the third wavelength, the third laser and the further lasers are each connected with an optical multiplexer by way of respective light waveguides, and the optical multiplexer is connected with the optical amplifier.

6. An optical system according to claim 5, wherein:
   the second laser emits unmodulated light of the second wavelength;

the third laser and the further lasers each transmit, as a plurality of transmitting lasers, light signals of the third wavelength modulated by respective communications signals through the optical multiplexer to the optical amplifier, so that an optical multiplex signal at the third wavelength formed in the optical multiplexer controls amplification of the light of the second wavelength in the optical amplifier and thus converts the optical multiplex signal of the third wavelength to an optical multiplex signal of the second wavelength.

7. An optical system according to claim 5, wherein the second laser emits light that is modulated by communication signals, and wherein the third laser and the further lasers each transmit light at one of a controlled and a communication content modulated intensity through the optical multiplexer to the optical amplifier, so that an optical multiplex signal of the third wavelength is formed in the optical multiplexer and one of controls amplification taking place in the optical amplifier, and modulates the communication content onto light emitted by the second laser.

8. A system according to claim 1, wherein the first laser is an InGaAs/GaAs semiconductor laser, the second laser is an In GaAsP/InP semiconductor laser and the third laser is a GaAlAs/GaAs semiconductor laser.

* * * * *